(12) United States Patent
Aoki et al.

(10) Patent No.: US 11,098,193 B2
(45) Date of Patent: Aug. 24, 2021

(54) (METH)ACRYLATE RESIN MATERIAL, SURFACE HARDNESS ENHANCER, POLYCARBONATE RESIN COMPOSITION, AND MOLDED ARTICLE

(71) Applicant: Mitsubishi Chemical Corporation, Tokyo (JP)

(72) Inventors: Yutaka Aoki, Otake (JP); Fumi Ooba, Otake (JP); Masahiro Ueda, Otake (JP); Shinji Matsuoka, Otake (JP); Mitsufumi Nodono, Otake (JP); Hikaru Momose, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/506,240

(22) Filed: Jul. 9, 2019

(65) Prior Publication Data

US 2020/0010673 A1 Jan. 9, 2020

Related U.S. Application Data

(62) Division of application No. 15/506,403, filed as application No. PCT/JP2015/074447 on Aug. 28, 2015, now Pat. No. 10,513,606.

(30) Foreign Application Priority Data

Aug. 29, 2014 (JP) .................. 2014-175471
Sep. 1, 2014 (JP) .................. 2014-177274
Nov. 12, 2014 (JP) .................. 2014-229713

(51) Int. Cl.
| C08L 69/00 | (2006.01) |
| C08K 5/09 | (2006.01) |
| C08L 33/14 | (2006.01) |
| C08F 220/14 | (2006.01) |
| C08F 220/18 | (2006.01) |
| C08K 5/06 | (2006.01) |
| C08K 5/13 | (2006.01) |

(52) U.S. Cl.
CPC ............ *C08L 69/00* (2013.01); *C08F 220/14* (2013.01); *C08F 220/18* (2013.01); *C08K 5/06* (2013.01); *C08K 5/09* (2013.01); *C08K 5/13* (2013.01); *C08L 33/14* (2013.01); *C08L 2205/06* (2013.01); *C08L 2205/24* (2013.01)

(58) Field of Classification Search
CPC .... C08F 220/14; C08F 220/16; C08F 220/18; C08F 220/06; C08F 220/20; C08F 220/1806; C08F 220/1811; C08F 222/02; C08L 2666/34; C08L 2666/40; C08L 69/00; C08L 33/12
See application file for complete search history.

(56) References Cited

U.S. PATENT DOCUMENTS

| 4,158,053 A | 6/1979 | Greene et al. |
| 4,906,696 A * | 3/1990 | Fischer ................... C08L 33/12 525/146 |
| 5,723,253 A | 3/1998 | Higashino et al. |
| 2005/0159533 A1* | 7/2005 | Nabeshima ............. C08L 51/00 524/494 |
| 2005/0202096 A1 | 9/2005 | Li et al. |
| 2009/0080079 A1* | 3/2009 | Kogure ................ G02B 5/0242 359/599 |
| 2010/0029855 A1* | 2/2010 | Matsuoka ............... C08L 69/00 525/228 |
| 2010/0197850 A1* | 8/2010 | Kim, II ................. C08F 220/26 524/502 |
| 2011/0009567 A1 | 1/2011 | Matsuoka et al. |
| 2013/0144023 A1 | 6/2013 | Kim et al. |
| 2015/0210851 A1 | 7/2015 | Tajima |

FOREIGN PATENT DOCUMENTS

| EP | 0584376 A1 | 3/1994 |
| EP | 2100918 A1 | 9/2009 |
| JP | S61-145260 A | 7/1986 |
| JP | 06-057157 A | 3/1994 |
| JP | 2001-066728 A | 3/2001 |
| JP | 2002-080676 A | 3/2002 |

(Continued)

OTHER PUBLICATIONS

Iizuka, Furukawa Review, No. 45, Mar. 2014, p. 22-27 (Year: 2014).*
Japanese Office Action dated May 28, 2019 in corresponding Japanese Patent Application No. 2015-545546 with machine English translation.
International Search Report issued in corresponding International Application No. PCT/JP2015/074447 dated Dec. 1, 2015.
Office Action issued in corresponiding Taiwanese Patent Application No. 104128278, dated Feb. 18, 2019.

(Continued)

*Primary Examiner* — Robert C Boyle
(74) *Attorney, Agent, or Firm* — Morgan, Lewis & Bockius LLP (57) ABSTRACT

A (meth)acrylate resin material comprising a polymer (A1) having constituent units (a1) derived from a compound represented by formula (1) and constituent units (a2) derived from methyl methacrylate, and an acid (B) and/or a nucleating agent (C). In the formula, Ar represents an aryl group, and the aromatic ring in Ar is directly bonded to the ester end in formula (1).

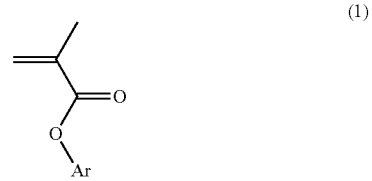

(1)

7 Claims, 3 Drawing Sheets

(56) References Cited

FOREIGN PATENT DOCUMENTS

| | | |
|---|---|---|
| JP | 2010-116501 A | 5/2010 |
| JP | 2012-207164 A | 10/2012 |
| JP | 2013-534942 A | 9/2013 |
| JP | 2013-241621 A | 12/2013 |
| JP | 2014-065901 A | 4/2014 |
| TW | 200835701 A | 9/2008 |
| WO | 2008/081791 A1 | 7/2008 |
| WO | 2009/078602 A1 | 6/2009 |
| WO | 2009/110091 A1 | 9/2009 |

OTHER PUBLICATIONS

Notification of Reason for Refusal issued in corresponding Korean Patent Application No. 10-2018-7028195, dated Oct. 26, 2018.
Extended European Search Report issued in corresponding European Patent Application No. 15835322.7 dated Jul. 31, 2017.

* cited by examiner

(METH)ACRYLATE RESIN MATERIAL, SURFACE HARDNESS ENHANCER, POLYCARBONATE RESIN COMPOSITION, AND MOLDED ARTICLE

TECHNICAL FIELD

The present invention relates to a (meth)acrylate resin material, a surface hardness enhancer, a polycarbonate resin composition, and a molded article.

This application is based upon and claims the benefit of priority of the prior Japanese Patent Application No. 2014-177274, filed in the Japanese Patent Office on Sep. 1, 2014, the prior Japanese Patent Application No. 2014-175471, filed in the Japanese Patent Office on Aug. 29, 2014, and the prior Japanese Patent Application No. 2014-229713, filed in the Japanese Patent Office on Nov. 12, 2014, the entire contents of which are incorporated herein by reference.

BACKGROUND ART

Molded articles of polycarbonate resins are widely used as members (housing and the like) of various kinds of devices (electrical devices, electronic devices, office automation devices, and the like), optical recording media, automobile parts, building members, and the like since they have an excellent mechanical strength and exhibit excellent heat resistance, electrical properties, dimensional stability, flame retardancy, transparency, and the like.

However, molded articles of polycarbonate resins have a deficient surface hardness so as not to be used as automobile head lamps, various kinds of sheets, and the like.

As a molded article which contains a polycarbonate resin and has an excellent surface hardness, the following one is disclosed.

A molded article obtained by molding a polycarbonate resin composition containing a surface hardness enhancer composed of a polymer (A) having a constitutional unit (a1) derived from an aromatic (meth)acrylate and a constitutional unit (a2) derived from methyl methacrylate and a polycarbonate resin (JP 2010-116501 A).

However, the compatibility between the polycarbonate resin and the (meth)acrylate polymer in the surface hardness enhancer is insufficient in the polycarbonate resin composition described in SP 2010-116501 A. Hence, molding defects such as whitening are often caused in the molded article described in Patent Literature 1.

CITATION LIST

Patent Literature

JP 2010-116501 A

DISCLOSURE OF INVENTION

The invention provides a (meth)acrylate resin material and a surface hardness enhancer which exhibit favorable compatibility with a polycarbonate resin and, in the case of being blended with a polycarbonate resin, provide a polycarbonate resin composition capable of providing a molded article which has an excellent surface hardness while maintaining the optical properties of the poly carbonate resin and suppressed molding defects such as whitening; a polycarbonate resin composition capable of providing a molded article which has an excellent surface hardness, excellent optical properties, and suppressed molding defects such as whitening; and a molded article which contains a polycarbonate resin and has an excellent surface hardness, excellent optical properties, and suppressed molding defects such as whitening.

The invention provides a method of manufacturing a molded article which has an excellent surface hardness, excellent optical properties, and suppressed molding defects such as whitening.

The invention has the following aspects.

[1] A (meth)acrylate resin material including:
a polymer (A1) having a constitutional unit (a1) derived from a compound represented by the following Formula (1) and a constitutional unit (a2) derived from methyl methacrylate and at least one or more between an acid (B) and a nucleophilic agent (C).

[Chem. 1]

(1)

Here, Ar is an aryl group, and an aromatic ring in Ar is directly bonded to an ester terminal in Formula (1).

[2] A (meth)acrylate resin material including:
a polymer (A2) having a constitutional unit (a1) derived from a compound represented by the following Formula (1), a constitutional unit (a2) derived from methyl methacrylate, and at least one or more between a constitutional unit (b1) derived from an acid (B) and a constitutional unit (c1) derived from a nucleophilic agent (C).

[Chem. 2]

(1)

Here, Ar is an aryl group, and an aromatic ring in Ar is directly bonded to an ester terminal in Formula (1).

[4] The (meth)acrylate resin material according to [2], further including at least one or more between an acid (B) and a nucleophilic agent (C).

[4] The (meth)acrylate resin material according to any one of [1] to [3], in which the constitutional unit (a1) is at least one or more between a constitutional unit derived from phenyl methacrylate and a constitutional unit derived from 2-naphthyl methacrylate.

[5] The (meth)acrylate resin material according to any one of [1] to [4], in which a proportion of the constitutional unit (a1) is from 5 to 50% by mass in 100% by mass of a sura of the constitutional unit (a1) and the constitutional unit (a2).

[6] The (meth)acrylate resin material according to any one of [1] to [5], in which a proportion of the constitutional unit (a1) is from 5 to 25% by mass in 100% by mass of a sum of the constitutional unit (a1) and the constitutional unit (a2).

[7] The (meth)acrylate resin material according to any one of [1] to [6], in which a proportion of the constitutional unit (a2) is from 50 to 95% by mass in 100% by mass of a sum of the constitutional unit (a1) and the constitutional unit (a2).

[8] The (meth)acrylate resin material according to any one of [1] to [7], in which the acid (B) is a compound having a carboxyl group.

[9] The (meth)acrylate resin material according to any one of [1] to [8], in which the acid (B) is at least one or more between methacrylic acid and acrylic acid.

[10] The (meth)acrylate resin material according to any one of [1] or [4] to [9], in which a content of the acid (B) is from 0.02 to 10 parts by mass with respect to 100 parts by mass of a sum of the constitutional unit (a1) and the constitutional unit (a2).

[11] The (meth)acrylate resin material according to any one of [2] to [9], in which a content of the constitutional unit (b1) or a total content of the acid (B) and the constitutional unit (b1) in a case of further including an acid (B) is from 0.02 to 10 parts by mass with respect to 100 parts by mass of a sum of the constitutional unit (a1) and the constitutional unit (a2).

[12] The (meth)acrylate resin material according to any one of [1] to [11], in which the nucleophilic agent (C) is a compound having a hydroxyl group.

[13] The (meth)acrylate resin material according to any one of [1] to [12], in which the nucleophilic agent (C) is a compound having a structure represented by the following Formula (2) in a molecule.

[Chem. 3]

(2)

[14] The (meth)acrylate resin material according to any one of [1] to [13], in which the nucleophilic agent (C) is a compound having a chemical structure to react with a polycarbonate resin in a molecule.

[15] The (meth)acrylate resin material according to any one of [1], [4] to [10], or [12] to [14], in which a content of the nucleophilic agent (C) is from 0.001 to 10 parts by mass with respect to 100 parts by mass of the polymer (A1).

[16] The (meth)acrylate resin material according to any one of [2] to [9] or [11] to [14], in which a content of the constitutional unit (c1) or a total content of the nucleophilic agent (C) and the constitutional unit (c1) in a case of further including the nucleophilic agent (C) is from 0.001 to 10 parts by mass with respect to 100 parts by mass of the polymer (A2).

[17] The (meth)acrylate resin material according to any one of [1] to [16], in which a mass average molecular weight of the polymer (A1) or the polymer (A2) is from 5000 to 30000.

[18] A surface hardness enhancer including the (meth)acrylate resin material according to any one of [1] to [17].

[19] A polycarbonate resin composition including:
a polycarbonate resin (D); and
the (meth)acrylate resin material according to any one of [1] to [17].

[20] A molded article obtained by molding the polycarbonate resin composition according to [19].

[21] The surface hardness enhancer according to [18], in which a pencil hardness of a molded article that is obtained by molding a polycarbonate resin composition containing the surface hardness enhancer according to [18] at 25 parts by mass with respect to 100 parts by mass of a polycarbonate resin (D) having a viscosity average molecular weight of 16000 or more and 25000 or less and has a thickness of 2 mm measured in conformity with JIS K 5600-5-4 is F or higher.

[22] The surface hardness enhancer according to [18], in which haze of a molded article that is obtained by molding a polycarbonate resin composition containing the surface hardness enhancer according to [18] at 25 parts by mass with respect to 100 parts by mass of a polycarbonate resin (D) having a viscosity average molecular weight of 16000 or more and 25000 or less and has a thickness of 2 mm measured in conformity with JIS K 7136 is 0.5% or less.

[23] The surface hardness enhancer according to [18], in which haze of a region of 16 mm×12 mm including a place at which whitening of a molded article is caused in the molded article that is obtained by molding a polycarbonate resin composition containing the surface hardness enhancer according to [18] at 25 parts by mass with respect to 100 parts by mass of a polycarbonate resin (D) having a viscosity average molecular weight of 16000 or more and 25000 or less and has a shape 1A described in JIS K7162 is 25% or less.

[24] A method of manufacturing a polycarbonate resin composition, in which a polycarbonate resin (D) is further blended at from 1 to 400 parts by mass with respect to 100 parts by mass of the polycarbonate resin composition according to [19].

[25] A polycarbonate resin composition having a peak at least at one or more retention times between 19.3 minutes and 22.1 minutes in a mass spectrum obtained when 5 μL of a 20% methanol solution of tetramethylammonium hydroxide (TMAH) is added to 200 μg of the polycarbonate resin composition, the polycarbonate resin composition and TMAH are thermally decomposed through a reaction by a thermal decomposition apparatus set at 400° C., and a gas thus generated is separated.

[26] The polycarbonate resin composition according to [25], including a polymer having a constitutional unit derived from at least one or more between chemical structures represented by the following Formula (3) and the following Formula (4).

[Chem. 4]

(3)

[Chem. 5]

(4)

The (meth)acrylate resin material of the invention exhibits favorable compatibility with a polycarbonate resin. In addition, a polycarbonate resin composition capable of providing a molded article which has an excellent surface hardness while maintaining the optical properties of the polycarbonate resin and suppressed molding defects such as whitening is obtained in the case of blending the (meth)acrylate resin material of the invention with a polycarbonate resin.

The surface hardness enhancer of the invention exhibits favorable compatibility with a polycarbonate resin. In addition, a polycarbonate resin composition capable of providing a molded article which has an excellent surface hardness while maintaining the optical properties of the polycarbonate resin and suppressed molding defects such as whitening is obtained in the case of blending the surface hardness enhancer of the invention with a polycarbonate resin.

According to the polycarbonate resin composition of the invention, it is possible to obtain a molded article having an excellent surface hardness, excellent optical properties, and suppressed molding defects such as whitening.

The molded article of the invention is a molded article which contains a polycarbonate resin and has an excellent surface hardness, excellent optical properties, and suppressed molding detects such as whitening.

By the manufacturing method of the invention, it is possible to obtain a molded article having an excellent surface hardness, excellent optical properties, and suppressed molding defects such as whitening.

BEST MODE FOR CARRYING OUT THE INVENTION

The definitions of the following terms apply throughout the present specification and the claims.

The term "constitutional unit" means a constitutional unit derived from a monomer in a polymer formed through polymerization of the monomer or a constitutional unit in which a part of the constitutional unit is converted into another structure through treatment of the polymer.

The term "mass average molecular weight" is a mass average molecular weight in terms of polystyrene measured by gel permeation chromatography (GPC) at a column temperature of 40° C. using tetrahydrofuran as an eluent.

The term "(meth)acrylate" is a generic name for an acrylate and a methacrylate.

<(Meth)acrylate Resin Material>

The (meth)acrylate resin material of the invention is the following (meth)acrylate resin material ($\alpha$) or (meth)acrylate resin material ($\beta$). The difference between the (meth)acrylate resin material ($\alpha$) and the (meth)acrylate resin material ($\beta$) is that at least one or more between an acid (B) and a nucleophilic agent (C) is contained as one component of the (meth)acrylate resin material or at least one or more between an acid (B) and a nucleophilic agent (C) is incorporated in the (meth)acrylate polymer as a constitutional unit of the polymer.

($\alpha$) a (meth)acrylate resin material containing a polymer (A1) having a constitutional unit (a1) derived from a compound represented by the following Formula (1) and a constitutional unit (a2) derived from methyl methacrylate and at least one or more between an acid (B) and a nucleophilic agent (C).

($\beta$) a (meth)acrylate resin material containing a polymer (A2) having a constitutional unit (a1) derived from a compound represented by the following Formula (1), a constitutional unit (a2) derived from methyl methacrylate, and at least one or more between a constitutional unit (b1) derived from an acid (B) and a constitutional unit (c1) derived from a nucleophilic agent (C).

[Chem. 6]

(1)

Here, Ar is an aryl group, and the aromatic ring in Ar is directly bonded to the ester terminal in Formula (1).

Incidentally, the (meth)acrylate resin material ($\beta$) may contain at least one or more between the acid (B) and the nucleophilic agent (C) as one component in addition to the polymer (A2).

(Polymer (A1))

The polymer (A1) has the constitutional unit (a1) and the constitutional unit (a2). The polymer (A1) may have a constitutional unit (a3) deprived from another monomer if necessary. The polymer (A1) does not have the constitutional unit (b1) derived from the acid (B) and the constitutional unit (c1) derived from the nucleophilic agent (C).

The mass average molecular weight of the polymer (A1) is preferably from 5,000 to 30,000, more preferably from 10,000 to 20,000, and still more preferably from 10,000 to 15,000. The molded article has a superior surface hardness when the mass average molecular weight of the polymer (A1) is 5000 or more. The molding defects of the molded article are further suppressed when the mass average molecular weight of the polymer (A1) is 30,000 or less.

Examples of the method of manufacturing the polymer (A1) may include a suspension polymerization method, a solution polymerization method, an emulsion polymerization method, and a hulk polymerization method which are known. As the method of manufacturing the polymer (A1), a suspension polymerization method or an emulsion polymerization method is preferable from the viewpoint of easy recovery of the polymer (A1).

(Polymer (A2))

The polymer (A2) has the constitutional unit (a1), the constitutional unit (a2), and at least one or more between the constitutional unit (b1) and the constitutional unit (c1). The polymer (A2) may have a constitutional unit (a3) derived from another monomer if necessary.

The mass average molecular weight of the polymer (A2) is preferably from 5,000 to 30,000, more preferably from 10,000 to 20,000, and still more preferably from 10,000 to 15,000. The molded article has a superior surface hardness when the mass average molecular weight of the polymer (A2) is 5000 or more. The molding defects of the molded article are further suppressed when the mass average molecular weight of the polymer (A2) is 30,000 or less.

Examples of the method of manufacturing the polymer (A2) may include a suspension polymerization method, a solution polymerization method, an emulsion polymerization method, and a bulk polymerization method which are known. As the method of manufacturing the polymer (A2), a suspension polymerization method or an emulsion polymerization method is preferable from the viewpoint of easy recovery of the polymer (A2).

(Constitutional Unit (a1))

The constitutional unit (a1) is a constitutional unit derived from a compound represented by the following Formula. (1), The constitutional unit (a1) improves the optical properties (transparency and the like) of the molded article.

[Chem. 7]

(1)

Here, Ar is an aryl group, and the aromatic ring in Ar is directly bonded to the ester terminal in Formula (1).

Examples of the compound represented by Formula (1) may include phenyl methacrylate, o-diphenyl methacrylate, p-diphenyl methacrylate, o-chlorophenyl methacrylate, 1-naphthyl methacrylate, 2-naphthyl methacrylate, 4-methoxyphenyl methacrylate, 4-chlorophenyl methacrylate, 2,4,6-trichlorophenyl methacrylate, and 4-tert-butylphenyl methacrylate. The constitutional unit (a1) may be used singly or two or more kinds thereof may be used concurrently.

As the constitutional unit (a1), at least one or more between a constitutional unit derived from phenyl methacrylate and a constitutional unit derived from 2-naphthyl methacrylate are preferable from the viewpoint of excellent heat resistance of the molded article.

The proportion of the constitutional unit (a1) is preferably from 5 to 50% by mass, more preferably from 10 to 40% by mass, and still more preferably from 15 to 30% by mass in 100% by mass of the sum of the constitutional unit (a1) and the constitutional unit (a2). In addition, the proportion of the constitutional unit (a1) is preferably from 5 to 30% by mass and more preferably from 5 to 25% by mass in 100% by mass of the sum of the constitutional unit (a1) and the constitutional unit (a2) as another aspect of the invention. The molded article exhibits superior optical properties such as transparency when the constitutional unit (a1) is 5% by mass or more. The molded article has a superior surface hardness when the constitutional unit (a1) is 50% by mass or less.

Incidentally, the proportion and content of the constitutional unit in the polymer can be calculated from, for example, the mass of the monomer used in manufacture of the polymer.

(Constitutional Unit (a2))

The constitutional unit (a2) is a constitutional unit derived from methyl methacrylate. The constitutional unit (a2) improves the surface hardness of the molded article.

The proportion of the constitutional unit (a2) is preferably from 50 to 95% by mass, more preferably from 60 to 90% by mass, and still more preferably from 70 to 85% by mass in 100% by mass of the sum of the constitutional unit (a1) and the constitutional unit (a2). In addition, the proportion of the constitutional unit (a2) is preferably from 70 to 95% by mass and more preferably from 75 to 95% by mass in 100% by mass of the sum of the constitutional unit (a1) and the constitutional unit (a2) as another aspect of the invention. The molded article has a superior surface hardness when the constitutional unit (a2) is 50% by mass or more. The molded article exhibits superior optical properties (transparency and the like) when the constitutional unit (a2) is 95% by mass or less.

(Constitutional Unit (a3))

The constitutional unit (a3) is a constitutional unit derived from a monomer other than the monomer having a chemical structure represented by Formula (1), methyl methacrylate, the acid (B), and the nucleophilic agent (C).

[Chem. 8]

(1)

Here, Ar is an aryl group, and the aromatic ring in Ar is directly bonded to the ester terminal in Formula (1).

Examples of the monomer constituting the constitutional unit (a3) may include the following ones.

Methacrylate: ethyl methacrylate, butyl methacrylate, propyl methacrylate, 2-ethylhexyl methacrylate, and the like (provided that the monomer having a chemical structure represented by Formula (1) and methyl methacrylate are excluded).

Acrylate: methyl acrylate, ethyl acrylate, butyl acrylate, propyl acrylate, 2-ethylhexyl acrylate, glycidyl acrylate, phenyl acrylate, 1-naphthyl acrylate, 2-naphthyl acrylate, p-diphenyl acrylate, o-diphenyl acrylate, o-chlorophenyl acrylate, 4-methoxyphenyl acrylate, 4-chlorophenyl acrylate, 2,4,6-trichlorophenyl acrylate, 4-tert-butylphenyl acrylate, and the like.

Vinyl cyanide monomer: acrylonitrile, methacrylonitrile, and the like.

Diene-based monomer: butadiene, isoprene, dimethylbutadiene, and the like.

Vinyl ether-based monomer: vinyl methyl ether, vinyl ethyl ether, and the like.

Carboxylic acid-based vinyl monomer: vinyl acetate, vinyl butyrate, and the like.

Olefin-based monomer: ethylene, propylene, isobutylene, and the like.

Vinyl halide-based monomer: vinyl chloride, vinylidene chloride, and the like.

Maleimide-based monomer: maleimide, N-phenylmaleimide, N-cyclohexylmaleimide, N-methylmaleimide, and the like.

Crosslinking agent: allyl (meth)acrylate, divinylbenzene, 1,3-butylene dimethacrylate, and the like.

As another monomer, a methacrylate, an acrylate, and a vinyl cyanide monomer are preferable from the viewpoint of excellent copolymerizability, namely, reactivity in copolymerization, and an acrylate is more preferable from the viewpoint of suppressing thermal decomposition of the polymer (A1) and polymer (A2).

Another monomer may be used singly or two or more kinds thereof may be used concurrently.

The content of the constitutional unit (a3) is preferably from 0 to 10 parts by mass with respect to 100 parts by mass of the sum of the constitutional unit (a1) and the constitutional unit (a2). The molded article exhibits excellent thermal decomposition resistance when the content of the constitutional unit (a3) is 10 parts by mass or less.

(Acid (B))

The acid (B) is a component contained in the (meth) acrylate resin material of the invention. The acid (B) is contained as one component of the (meth)acrylate resin material in the (meth)acrylate resin material (α), and it is contained as the constitutional unit (b1) of the polymer (A2) in the (meth)acrylate resin material (β).

The acid (B) improves the compatibility between a polycarbonate resin and the (meth)acrylate resin material or the surface hardness enhancer.

(B) is not particularly limited as long as it is a compound capable of generating a proton, namely, a Broensted acid. Examples of the acid (B) may include methacrylic acid, acrylic acid, anhydrous methacrylic acid, anhydrous acrylic acid, maleic acid, anhydrous maleic acid, itaconic acid, stearic acid, acetic acid, citric acid, formic acid, lactic acid, oxalic acid, tartaric acid, ascorbic acid, Meldrum's acid, hydrochloric acid, sulfuric acid, fuming sulfuric acid, phosphoric acid, fluorosulfonic acid, nitric acid, chromic acid, boric acid, and benzenesulfonic acid. As (B), a compound having a carboxyl group is preferable from the viewpoint of excellent heat resistance of the molded article, and at least one or more between methacrylic acid and acrylic acid are more preferable from the viewpoint of excellent copolymerizability.

The content of the acid (B) in the (meth)acrylate resin material (α) is preferably from 0.001 to 10 parts by mass, more preferably from 001 to 5 parts by mass, and still more preferably from 0.001 to 2 parts by mass with respect to 100 parts by mass of the sum of the constitutional unit (a1) and the constitutional unit (a2). In addition, the content of the acid (B) in the (meth)acrylate resin material (α) is preferably from 0.02 to 10 parts by mass, more preferably from 0.02 to 5 parts by mass, and still more preferably from 0.02 to 2 parts by mass with respect to 100 parts by mass of the sum of the constitutional unit (a1) and the constitutional unit (a2) as another aspect of the invention. The molding defects of the molded article are further suppressed when the content of the acid (B) in the (meth)acrylate resin material (α) is 0.001 part by mass or more. The polycarbonate resin composition exhibits excellent moldability when the content of the acid (B) in the (meth)acrylate resin material (α) is 10 parts by mass or less.

(Constitutional Unit (b1))

The constitutional unit (b1) is a constitutional unit derived from acid (B).

As the acid (B) constituting the constitutional unit (b1), an acid (B1) copolymerizable with a monomer having a chemical structure represented by Formula (1), methyl methacrylate, or another monomer is preferable among the acids (B) from the viewpoint of being easily introduced as a constitutional unit.

[Chem. 9]

(1)

Here, Ar is an aryl group, and the aromatic ring in Ar is directly bonded to the ester terminal in Formula (1).

Examples of the acid (B1) constituting the constitutional unit (b1) may include methacrylic acid, acrylic acid, anhydrous methacrylic acid, anhydrous acrylic acid, maleic acid, anhydrous maleic acid, and itaconic acid.

The content of the constitutional unit (b1) in the (meth) acrylate resin material (β) or the total content of the acid (B) and the constitutional unit (b1) in the case of further containing the acid (B) is preferably from 0.001 to 10 parts by mass, more preferably from 0.001 to 5 parts by mass, and still more preferably from 0.001 to 2 parts by mass with respect to 100 parts by mass of the sum of the constitutional unit (a1) and the constitutional unit (a2). In addition, the content of the constitutional unit (b1) in the (meth)acrylate resin material (β) or the total content of the acid (B) and the constitutional unit (b1) in the case of further containing the acid (B) is preferably from 0.02 to 10 parts by mass, more preferably from 0.02 to 5 parts by mass, and still more preferably from 0.02 to 2 parts by mass with respect to 100 parts by mass of the sum of the constitutional unit (a1) and the constitutional unit (a2) as another aspect of the invention. The molding defects of the molded article are further suppressed when the content of the constitutional unit (b1) in the (meth)acrylate resin material (β) or the total content of the acid (B) and the constitutional unit (b1) in the case of further containing the acid (B) is 0.001 part by mass or more. The polycarbonate resin composition exhibits excellent moldability when the content of the constitutional unit (b1) in the (meth)acrylate resin material (β) or the total content of the acid (B) and the constitutional unit (b1) in the case of further containing the acid (B) is 10 parts by mass or less.

The (meth)acrylate resin material of the invention described above exhibits favorable compatibility with a polycarbonate resin since it contains the acid (B) or the (meth)acrylate polymer has the constitutional unit (b1) derived from the acid (B). Consequently, a polycarbonate resin composition capable of providing a molded article having suppressed molding defects is obtained in the case of blending the (meth)acrylate resin material of the invention with a polycarbonate resin.

In addition, in the (meth)acrylate resin material of the invention, the (meth)acrylate polymer has the constitutional unit (a2) derived from methyl methacrylate, and it is thus possible to obtain a molded article having an excellent surface hardness in the case of blending the (meth)acrylate resin material of the invention with a polycarbonate resin.

In addition, in the (meth)acrylate resin material of the invention, the (meth)acrylate polymer has the constitutional unit (a1) derived from a compound represented by Formula (1), and a polycarbonate resin composition capable of providing a molded article exhibiting excellent optical properties, namely, transparency is thus obtained in the case of blending the (meth)acrylate resin material of the invention with a polycarbonate resin.

(Nucleophilic Agent (C))

The nucleophilic agent (C) is a component contained in the (meth)acrylate resin composition of the invention. The nucleophilic agent (C) improves the compatibility between a polycarbonate resin and the (meth)acrylate resin material and the surface hardness enhancer.

The nucleophilic agent (C) is not particularly limited as long as it is a compound exhibiting nucleophilicity. Examples of the nucleophilic agent (C) may include a compound having a hydroxyl group, an amine, an organophosphorus compound, and a compound having a chemical structure which reacts with a polycarbonate resin in the molecule.

Examples of the compound having a hydroxyl group may include methanol, ethanol, isopropanol, ethylene glycol, glycerin, lauryl alcohol, stearyl alcohol, bisphenol A, bisphenol AP, bisphenol B, bisphenol BP, bisphenol C, bisphenol E, bisphenol F, bisphenol G, bisphenol M, bisphenol S, bisphenol P, hydroxyethyl acrylate, hydroxyethyl methacrylate, hydroxypropyl acrylate, hydroxypropyl methacrylate, hydroxybutyl methacrylate, and hydroxybutyl acrylate.

Examples of the amine may include ammonia, trimethylamine, aniline, dimethylaminoethyl methacrylate, dimethylaminoethyl acrylate, diethylaminoethyl methacrylate, diethylaminoethyl acrylate, tert-butylaminoethyl methacrylate, and tert-butylaminoethyl acrylate.

Examples of the organophosphorus compound may include phosphine, triphenylphosphine, trimethylphosphine, triethylphosphine. 2-phosphonooxyethyl methacrylate, and 2-phosphonooxyethyl acrylate.

Examples of the compound having a chemical structure which reacts with a polycarbonate resin in the molecule may include acetolactone, propiolactone, butyrolactone, valerolactone, and a (meth)acrylate having a chemical structure represented by the following Formula (5).

[Chem. 10]

(5)

In Formula (5), n=1 to 20, and m=1 to 20.

It is preferable that n=1 to 10 and m=1 to 10 and it is more preferable that n=1 to 5 and m=1 to 5 since it is possible to suppress molding defects of the molded article.

As the nucleophilic agent (C), it is preferable to use a compound having a hydroxyl group from the viewpoint of obtaining a molded article which exhibits excellent optical properties.

As the nucleophilic agent (C), a compound having a structure represented by the following Formula (2) in the molecule is preferable and a compound which has a structure represented by the following Formula (2) in the molecule and a hydroxyl group is still more preferable from the viewpoint of obtaining a molded article which exhibits excellent optical properties.

[Chem. 11]

(2)

As the compound which has a structure represented by Formula (2) in the molecule and a hydroxyl group, those having a hydroxyaryl group are preferable, and examples thereof may include bisphenol A, bisphenol C, and bisphenol P.

The content of the nucleophilic agent (C) in the (meth) acrylate resin material (α) is preferably from 0.001 to 10 parts by mass, more preferably from 0.001 to 5 parts by mass, and still more preferably from 0.001 to 2 parts by mass with respect to 100 parts by mass of the polymer (A1). The molding defects of the molded article are further suppressed when the content of the nucleophilic agent (C) is 0.001 part by mass or more. In addition, the molded article exhibits excellent thermal properties such as heat resistance when the content of the nucleophilic agent (C) is 10 parts by mass or less.

(Constitutional Unit (c1))

The constitutional unit (c1) is a constitutional unit derived from the nucleophilic agent (C). The constitutional unit (c1) improves the compatibility between a polycarbonate resin and the (meth)acrylate resin material and the surface hardness enhancer.

As the nucleophilic agent (C) constituting the constitutional unit (c1), a nucleophilic agent (C1) copolymerizable with a monomer having a chemical structure represented by Formula (1), methyl methacrylate, or another monomer is preferable among the nucleophilic agents (C) from the viewpoint of being easily introduced into the polymer (A2) as a constitutional unit.

[Chem. 12]

(1)

Here, Ar is an aryl group, and the aromatic ring in Ar is directly bonded to the ester terminal in Formula (1).

Examples of the nucleophilic agent (C1) may include a compound having a hydroxyl group, an amine, an organophosphorus compound, and a compound having a chemical structure which reacts with a polycarbonate resin in the molecule.

Examples of the compound having a hydroxyl group may include hydroxybutyl methacrylate, hydroxybutyl acrylate, hydroxyethyl methacrylate, and hydroxyethyl acrylate.

Examples of the amine may include dimethylaminoethyl methacrylate, dimethylaminoethyl acrylate, diethylaminoethyl methacrylate, diethylaminoethyl acrylate, tert-butylaminoethyl methacrylate, and tert-butylaminoethyl acrylate.

Examples of the organophosphorus compound may include 2-phosphonooxyethyl methacrylate and 2-phosphonooxyethyl acrylate.

Examples of the compound having a chemical structure which reacts with a polycarbonate resin in the molecule may include a (meth)acrylate having a chemical structure represented by the following Formula (5). Examples of such a compound may include the "PLACCEL FA1", "PLACCEL FA2", "PLACCEL FA3", "PLACCEL FA4", "PLACCEL FA5", "PLACCEL FM1", "PLACCEL FM2", "PLACCEL FM3", "PLACCEL FM4", and "PLACCEL FM5" of trade names manufactured by DAICEL CORPORATION. These may be used singly or two or more kinds thereof may be used concurrently. The "PLACCEL FM1", "PLACCEL FM2", "PLACCEL FM3", "PLACCEL FM4", and "PLACCEL FM5" are preferable from the viewpoint of excellent heat resistance of the molded article. In addition, the proportion occupied by a chemical structure represented by the following Formula (5) in the total mass of the (meth)acrylate is preferably from 0.0001 to 30% by mass.

[Chem. 13]

(5)

In Formula (5), n=1 to 20 and m=1 to 20.

It is preferable that n=1 to 10 and m=1 to 10 and it is more preferable that n=1 to 5 and m=1 to 5 since it is possible to suppress molding defects of the molded article.

As the nucleophilic agent (C1), a compound having a chemical structure which reacts with a polycarbonate resin in the molecule is preferable since molding defects are suppressed.

The content of the constitutional unit (c1) in the (meth)acrylate resin material (β) or the total content of the nucleophilic agent (C) and the constitutional unit (c1) in the case of further containing the nucleophilic agent (C) is preferably from 0.001 to 10 parts by mass, more preferably from 0.001 to 5 parts by mass, and still more preferably from 0.001 to 1 part by mass with respect to 100 parts by mass of the sum of the polymer (A2). The molding defects of the molded article are further suppressed when the content of the constitutional unit (c1) in the (meth)acrylate resin material (β) or the total content of the nucleophilic agent (C) and the constitutional unit (c1) in the case of further containing the nucleophilic agent (C) is 0.001 part by mass or more. The molded article exhibits superior optical properties (transparency and the like) when the content of the constitutional unit (c1) in the (meth)acrylate resin material (β) or the total content of the nucleophilic agent (C) and the constitutional unit (c1) in the case of further containing the nucleophilic agent (C) is 10 parts by mass or less.

The (meth)acrylate resin material of the invention described above exhibits favorable compatibility with a polycarbonate resin since it contains the nucleophilic agent (C) or the (meth)acrylate polymer has the constitutional unit (c1) derived from the nucleophilic agent (C). Consequently, it is possible to obtain a molded article having suppressed molding defects by molding a composition in which the (meth)acrylate resin material of the invention is blended with a polycarbonate resin.

In addition, in the (meth)acrylate resin material of the invention, the polymer (A1) or polymer (A2) has the constitutional unit (a2) derived from methyl methacrylate, and it is thus possible to obtain a molded article having an excellent surface hardness by molding a composition in which the (meth)acrylate resin material of the invention is blended with a polycarbonate resin.

In addition, in the (meth)acrylate resin material of the invention, the polymer (A1) or polymer (A2) has the constitutional unit (a1) derived from the following Formula (1), and it is thus possible to obtain a molded article exhibiting excellent optical properties, namely, transparency in the case of blending the (meth)acrylate resin material of the invention with a polycarbonate resin.

[Chem. 14]

(1)

Here, Ar is an aryl group, and the aromatic ring in Ar is directly bonded to the ester terminal in Formula (1).

<Surface Hardness Enhancer>

The (meth)acrylate resin material of the invention can be suitably used as a surface hardness enhancer of a polycarbonate resin since it exerts the effects described above.

Moreover, the surface hardness enhancer of the invention can exert the same effects as those of the (meth)acrylate resin material of the invention.

With regard to the surface hardness enhancer of the invention, it is preferable that a pencil hardness of a molded article that is obtained by blending the surface hardness enhancer at 25 parts by mass with respect to 100 parts by mass of a polycarbonate resin (D) having a viscosity average molecular weight of from 16000 to 25000 and molding the mixture and has a thickness of 2 mm measured in conformity with JIS K 5600-5-4 is F or higher.

With regard to the surface hardness enhancer of the invention, the haze of a molded article that is obtained by blending the surface hardness enhancer at 25 parts by mass with respect to 100 parts by mass of a polycarbonate resin (D) having a viscosity average molecular weight of from 16000 to 25000 and molding the mixture and has a thickness of 2 mm measured in conformity with JIS K 7136 is preferably 0.5% or less, more preferably 0.45% or less, and still more preferably 0.4% or less.

With regard to the surface hardness enhancer of the invention, the haze of a region of 16 mm×12 mm including a place at which whitening of a molded article is caused in the molded article that is obtained by blending the surface hardness enhancer at 25 parts by mass with respect to 100 parts by mass of a polycarbonate resin (D) having a viscosity average molecular weight of from 16000 to 25000 and molding the mixture at an injection temperature of 280° C., a mold temperature of 80° C., and an injection pressure of 95 MPa by using a 100 t injection molding machine SE-100U manufactured by Sumitomo Heavy Industries, Ltd. and has the shape 1A described in JIS K7162 is preferably 25% or less, more preferably 20% or less, and still more preferably 17% or less.

<Polycarbonate Resin Composition>

The polycarbonate resin composition of the invention contains a polycarbonate resin (D) and the (meth)acrylate resin material of the invention. The polycarbonate resin composition of the invention may contain a component other than the polycarbonate resin (D) and the (meth)acrylate resin material of the invention if necessary.

(Polycarbonate Resin (D))

The polycarbonate resin (D) is not particularly limited as long as it is a polymer compound having a carbonic ester bond (—O—C(O)—O—) in the main chain.

Examples of the polycarbonate resin (D) ay include an aromatic polycarbonate that is usually produced through a reaction between a dihydric phenol and a carbonate precursor. Specific examples thereof may include those produced by reacting a dihydric phenol with a carbonate precursor by a solution method or a melting method, and more specific examples thereof may include those produced by reacting a dihydric phenol with phosgene and those produced by reacting a dihydric phenol with diphenyl carbonate or the like by a transesterification method.

Examples of the dihydric phenol may include 2,2-bis(4-hydroxyphenyl)propane [bisphenol A], 2,2-bis(3-methyl-4-hydroxyphenyl)propane [bisphenol C], bis(hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, bis(4-hydroxyphenyl) ketone, and any halogen substituted product thereof. In addition to these, examples of the dihydric phenol may include hydroquinone, resorcin, and catechol.

As the dihydric phenol, bis(hydroxyphenyphenyl)alkane-based one is preferable and bisphenol A is particularly preferable from the viewpoint of cost.

The dihydric phenol may be used singly or two or more kinds thereof may be used concurrently.

Examples of the carbonate precursor may include a carbonyl halide, a carbonyl ester, and a haloformate, and specific examples thereof may include phosgene, a dihaloformate of a dihydric phenol, diphenyl carbonate, dimethyl carbonate, and diethyl carbonate.

The polycarbonate resin (D) may have a branched structure. Examples of the branching agent for introducing the branched structure into the polycarbonate resin (D) may include 1,1,1-tris(4-hydroxyphenyl)ethane, α,α',α"-tris(4-hydroxyphenyl)-1,3,5-triisopropylbenzene, phloroglucin, trimellitic acid, and isatin bis(o-cresol).

The polycarbonate resin (D) may be a copolymer having a polycarbonate portion and a polyorganosiloxane portion, or it may be a polycarbonate resin containing this copolymer. The polyorganosiloxane portion is preferably from 1 to 40% by mass in the total mass of the polycarbonate resin (D) in a case in which the polycarbonate resin (D) contains the polyorganosiloxane portion.

The polycarbonate resin (D) may be a polyester-polycarbonate resin obtained by reacting a dihydric phenol with a carbonate precursor in the presence of an ester precursor, namely, a bifunctional carboxylic acid such as terephthalic acid, an ester forming derivative thereof, or the like. The polyester portion is preferably from 1 to 50% by mass in the total mass of the polycarbonate resin (D) in a case in which the polycarbonate resin (D) is a polyester-polycarbonate resin.

The polycarbonate resin (D) may be a mixture of various polycarbonate resins.

In the manufacture of the polycarbonate resin (D), phenol, p-t-butylphenol, p-t-octylphenol, p-cumylphenol, and the like may be used for adjustment of the molecular weight.

The viscosity average molecular weight of the polycarbonate resin (D) can be calculated by a viscosity method, and it is preferably from 15,000 to 30,000, more preferably from 16,000 to 27,000, and still more preferably from 17,000 to 25,000. The polycarbonate resin composition exhibits excellent moldability and the molded article has an excellent surface hardness when the viscosity average molecular weight is within the above range.

In the case of using phenol, p-t-butylphenol, p-t-octylphenol, p-cumylphenol, and the like for adjustment of the molecular weight, the proportion of these to the total mass of the polycarbonate resins (D) is, for example, from 1 to 50% by mass.

(Other Components)

The polycarbonate resin composition of the invention may contain various kinds of additives such as an antioxidant, an ultraviolet absorber, a light stabilizer, and a flame retardant and various kinds of fillers such as glass, mica, talc, and rubber particles if necessary.

The polycarbonate resin composition of the invention may contain a resin other than the polycarbonate resin in a range in which the effect of the invention is not impaired.

The polycarbonate resin composition of the invention contains a compound (also referred to as an exchange compound) produced as some or all of the side chain aryl esters in the constitutional unit (a1) is exchange-reacted with arbitrary one or more between a carbonyl bond and an ester bond in the polycarbonate resin (D). An apparatus for gas chromatography-mass spectrometry (GC-MS) equipped with a thermal decomposition apparatus is used for the measurement of the proportion of these exchange compounds. The thermal decomposition apparatus may be an apparatus that can directly introduce the gas generated by thermal decomposition to the GC-MS apparatus, for example, a micro vertical type such as the model PY-3030 manufactured by Frontier Laboratories Ltd. or a Curie point type such as the model JHP-5 manufactured by Japan Analytical Industry Co., Ltd.

Mixed are 200 μg of the polycarbonate resin composition and 5 μL of a 20% methanol solution of tetramethylammonium hydroxide (TMAH). The mixture is introduced into the thermal decomposition apparatus set at 400° C. and the sample and TMAH are thermally decomposed through a reaction. The gas generated by the reaction thermal decomposition is introduced into the GC-MS apparatus, separated into each component by the column in the apparatus for gas chromatography (GC), and analyzed by the apparatus for mass spectrometry (MS), thereby obtaining a mass spectrum. The measurement conditions of the GC-MS apparatus are, for example, as follows.

Inlet temperature of GC apparatus: 280° C.

Separation column: DB-5 (length: 30 m×inner diameter: 0.25 mm×film thickness: 0.25 μm)

Oven temperature of GC apparatus: 50° C. (kept for 2 minutes)→raising of temperature at 10° C./min→320° C. (kept for 11 minutes)

Interface temperature of GC-MS apparatus: 280° C.

For example, in a case in which there is an exchange compound, a peak derived from the reaction thermal decomposition product of the exchange compound is observed. Examples of the peak derived from the reaction thermal decomposition product of the exchange compound may include a peak that is derived from bisphenol A dimethyl ether represented by the following Formula (3) at a retention time of 19.3 minutes and a peak that is derived from methacrylate bisphenol A methyl ether represented by the following Formula (4) at a retention time of 22.1 minutes.

[Chem. 15]

(3)

[Chem. 16]

(4)

[Chem. 17]

(1)

Here, Ar is an aryl group, and the aromatic ring in Ar is directly bonded to the ester terminal in Formula (1).

<Molded Article>

The molded article of the invention can be obtained by molding the polycarbonate resin composition of the invention.

Examples of the molding method may include a known method such as an injection molding method, an extrusion molding method, or a compression molding method. As the molding method, an injection molding method and an extrusion molding method are preferable from the viewpoint of being able to mold the polycarbonate resin composition into a desired shape.

The molded article of the invention described above is one that is obtained by molding the polycarbonate resin composition of the invention, and it thus has an excellent surface hardness and suppressed molding detects such as whitening.

In addition, the molded article of the invention described above is one that is obtained by molding the polycarbonate resin composition of the invention, and it thus exhibits excellent optical properties, namely, transparency.

(Method of Manufacturing Polycarbonate Resin Composition)

The polycarbonate resin composition of the invention can be manufactured by melt-kneading the polycarbonate resin (D), the (meth)acrylate resin material of the invention, and, if necessary, other components.

Examples of the melt-kneading apparatus may include the Banbury mixer, a kneader, a roll, a kneader ruder, a single screw extruder, a twin screw extruder, and a multi-screw extruder.

The polycarbonate resin composition of the invention can be manufactured by melt-kneading the (meth)acrylate resin material at from 0.1 to 60 parts by mass with respect to 100 parts by mass of the polycarbonate resin (D).

In addition, the polycarbonate resin composition of the invention can be manufactured by melt-kneading the (meth) acrylate resin material at from 1 to 300 parts by mass with respect to 100 parts by mass of the polycarbonate resin (D) and, if necessary, other components, blending the polycarbonate resin (D) at from 1 to 400 parts by mass with the polycarbonate resin composition thus obtained, and melt-kneading the mixture.

(Composition of Polycarbonate Resin Composition)

The content of the (meth)acrylate resin material of the invention is preferably from 0.1 to 60 parts by mass, more preferably from 10 to 50 parts by mass, and still more preferably from 20 to 45 parts by mass respect to 100 parts by mass of the polycarbonate resin (D). The molded article has a superior surface hardness when the content of the (meth)acrylate resin material is 0.1 part by mass or more. The molded article exhibits superior optical properties, namely, (transparency and the like) when the content of the (meth)acrylate resin material is 60 parts by mass or less.

The polycarbonate resin composition of the invention described above contains the (meth)acrylate resin material of the invention which exhibits favorable compatibility with the polycarbonate resin (D), and it is thus possible to obtain a molded article having suppressed molding defects such as whitening in the case of molding the polycarbonate resin composition of the invention.

In addition, in the polycarbonate resin composition of the invention, the (meth)acrylate resin material of the invention contains the (meth)acrylate polymer having the constitutional unit (a2) derived from methyl methacrylate, and it is thus possible to obtain a molded article having an excellent surface hardness in the case of molding the polycarbonate resin composition of the invention.

In addition, in the polycarbonate resin composition of the invention, the (meth)acrylate resin material of the invention contains the (meth)acrylate polymer having the constitutional unit (a1) derived from the following Formula (1), and it is thus possible to obtain a molded article exhibiting excellent optical properties, namely, transparency in the case of molding the polycarbonate resin composition of the invention.

EXAMPLES

Hereinafter, the invention will be described with reference to Examples. In Examples, the term "parts" represents "parts by mass". The methods of determining the proportion and mass average molecular weight of the respective constitutional units of the polymer and the method of evaluating the molded article are as follows.

(Proportion of Constitutional Unit)

The proportions of the respective constitutional units of the polymer were calculated from the charged amounts of the monomers.

(Mass Average Molecular Weight)

The elution curve of the polymer dissolved in tetrahydrofuran (THF) was measured at a column temperature of 40° C. by gel permeation chromatography (GPC) using tetrahydrofuran as an eluent, and the mass average molecular weight of the polymer was calculated based on the calibration curve by standard polystyrene.

(Molding Defects)

The molding defects of a molded article were evaluated from the extent of whitening occurred on the molded article by visually observing a molded article having a thickness of 4 mm according to the following criteria.

A: Whitening is improved as compared with Comparative Example 1.

B: Whitening is caused to the same extent with Comparative Example 1.

C: Whitening is deteriorated as compared with Comparative Example 1.

(Haze of Whitened Site)

The haze of a region of 16 mm×12 mm including a place at which whitening of the molded article was caused on a molded article having the shape IIS K7162-1A was measured by using a haze meter NDH2000 (manufactured by NIPPON DENSHOKU INDUSTRIES Co., LTD.) in conformity with JIS K 7136.

(Pencil Hardness)

The pencil hardness of the surface of a molded article having a thickness of 2 mm was measured in conformity with JIS K 5600-5-4.

(Transparency)

The haze of a molded article having a thickness of 2 mm was measured by using a haze meter NDH2000 (manufactured by NIPPON DENSHOKU INDUSTRIES Co., LTD.) in conformity with JIS K 7136.

(Thermal Decomposition Measurement)

Mixed were 200 μg of a polycarbonate resin composition and 5 μL of a 20% methanol solution of tetramethylammonium hydroxide (TMAH). The mixture was introduced into the thermal decomposition apparatus set at 400° C. and the sample and TMAH were thermally decomposed through a reaction. The gas generated by the reaction thermal decomposition was introduced into a GC-MS apparatus (model PY-3030 manufactured by Frontier Laboratories Ltd.), separated into each component by the column in the apparatus for gas chromatography (GC), and analyzed by the apparatus for mass spectrometry (MS), thereby obtaining a mass spectrum. The measurement conditions of the GC-MS apparatus were set to as follows.

Inlet temperature of GC apparatus: 280° C.

Separation column: DB-5 (length: 30 m×inner diameter: 0.25 mm×film thickness: 0.25 μm)

Oven temperature of GC apparatus: 50° C. (kept for 2 minutes)→raising of temperature at 10° C. min→320° C. (kept for 11 minutes)

Interface temperature of GC-MS apparatus: 280° C.

Carrier gas: Helium gas

Flow rate: 1 ml/min under constant flow condition

Example 1

Synthesis of Dispersant:

Into a 1200 L reaction vessel equipped with a stirrer, a cooling tube, and a thermometer, 61.6 parts of a 17% by mass aqueous solution of potassium hydroxide, 19.1 parts of methyl methacrylate (ACRYESTER M manufactured by MITSUBISHI RAYON CO., LTD.), and 19.3 parts of deionized water were charged. The solution in the reactor was stirred at room temperature, the exothermic peak thereof was confirmed, and the solution was then further stirred for 4 hours. Thereafter, the reaction mixture in the reactor was cooled to room temperature, thereby obtaining an aqueous solution of potassium methacrylate.

Into a 1050 L reaction vessel equipped with a stirrer, a cooling tube, and a thermometer, 900 parts of deionized water, 60 parts of sodium 2-sulfoethyl methacrylate (ACRYESTER SEM-Na manufactured by MITSUBISHI RAYON CO., LTD., 42% by mass aqueous solution), 10 parts of an aqueous solution of potassium methacrylate, and 12 parts of methyl methacrylate (ACRYESTER M manufactured by MITSUBISHI RAYON CO., LTD.) were charged and stirred, the temperature was raised to 50° C. while purging the inside of the polymerization apparatus with nitrogen. Thereto, 0.08 part of 2,2'-azobis(2-methyl-propionamidine)dihydrochloride (V-50 manufactured by Wako Pure Chemical Industries, Ltd.) was added as a polymerization initiator, and the temperature was further raised to 60° C. After the temperature was raised, methyl methacrylate (ACRYESTER M manufactured by MITSUBISHI RAYON CO., LTD.) was continuously added thereto dropwise for 75 minutes at a rate of 0.24 part/min. The reaction solution was kept at 60° C. for 6 hours and then cooled to room temperature, thereby obtaining a dispersant having a solid content of 10% by mass of a transparent aqueous solution.

Synthesis of (Meth)acrylate Resin Material (β1):

Into a polymerization apparatus equipped with a stirrer, a cooling tube, and a thermometer, 200 parts of deionized water, 0.3 part of sodium sulfate (Na2SO4), and 0.26 part of a dispersant (solid content: 10% by mass) were charged and stirred to obtain a uniform aqueous solution. To the aqueous solution in the polymerization apparatus, 20.3 parts of phenyl methacrylate (ACRYESTER PH manufactured by MITSUBISHI RAYON CO., LTD.) as a compound constituting the constitutional unit (a1), 79.7 parts of methyl methacrylate (ACRYESTER M manufactured by MITSUBISHI RAYON CO., LTD.) as a compound constituting the constitutional unit (a2), 1.52 parts of methyl acrylate) (manufactured by Wako Pure Chemical Industries, Ltd., special grade chemical) as a compound constituting the constitutional unit (a3), 0.28 part of methacrylic acid (manufactured by MITSUBISHI RAYON CO., LTD.) as the acid (B) constituting the constitutional unit (b1), 2 parts of 1-octanethiol (manufactured by TOKYO CHEMICAL INDUSTRY CO., LTD.) as a chain transfer agent, and 0.3 part of 2,2-azobis-2-methylbutyronitrile (AMBN manufactured by NOF CORPORATION) as a polymerization initiator were further added, thereby preparing an aqueous dispersion. The inside of the polymerization apparatus was thoroughly purged with nitrogen, the temperature of the aqueous dispersion was raised to 75° C. and kept for 3 hours, and the temperature was raised to 85° C. and kept for 1.5 hours. The aqueous dispersion was cooled to 40° C., thereby obtaining an aqueous suspension of a polymer. The aqueous suspension was filtered through a filter cloth, and the filtered product was washed with deionized water and dried at 75° C. for 18 hours, thereby obtaining a polymer. The polymer thus obtained was used as the (meth)acrylate resin material (β1). The proportions and mass average molecular weights of the respective constitutional units of the polymer constituting the (meth)acrylate resin material (β1) are presented in Table 1.

TABLE 1

| | | | Constituent of (A1) or (A2) | | | |
| --- | --- | --- | --- | --- | --- | --- |
| | | | Proportion of constitutional unit in 100% by mass of (a1) + (a2) (% by mass) | | Amount of constitutional unit with respect to 100 parts by mass of (a1) + (a2) (parts by mass) | Amount of constitutional unit with respect to 100 parts by mass of (a1) + (a2) (parts by mass) |
| | | | (a1) | (a2) | (a3) | (b1) |
| | | (Meth)acrylate resin material | Phenyl methacrylate | Methyl methacrylate | Methyl acrylate | Methacrylic acid / Acrylic acid |
| Example | 1 | b1 | 20.3 | 79.7 | 1.52 | 0.28 |
| | 2 | b2 | 20.3 | 79.7 | 1.52 | 1.12 |

TABLE 1-continued

|  |  |  |  |  |  |  |
|---|---|---|---|---|---|---|
|  | 3 | b3 | 20.3 | 79.7 | 1.52 | 0.025 |
|  | 4 | b4 | 20.3 | 79.7 | 1.52 | 0.1 |
|  | 5 | b5 | 20.3 | 79.7 | 1.52 | 0.1 |
|  | 6 | b6 | 15.2 | 84.8 | 1.52 | 0.1 |
|  | 7 | b7 | 20.3 | 79.7 | 1.52 |  | 0.1 |
|  | 8 | b8 | 20.3 | 79.7 | 1.52 |
|  | 9 | b9 | 20.3 | 79.7 | 1.52 |
|  | 10 | b10 | 15.2 | 84.8 | 1.52 |
|  | 11 | a1 | 20.3 | 79.7 | 1.52 |
|  | 12 | a2 | 20.3 | 79.7 | 1.52 |
|  | 13 | a3 | 20.3 | 79.7 | 1.52 |
|  | 14 | a4 | 20.3 | 79.7 | 1.52 |
|  | 15 | b15 | 20.3 | 79.7 | 1.52 | 0.1 |
|  | 16 | a6 | 20.3 | 79.7 | 1.52 |
| Comparative | 1 | g1 | 20.3 | 79.7 | 1.52 |
| Example | 2 | g2 | 0 | 100 | 1.52 |
|  | 3 | g3 | 0 | 100 | 1.52 | 0.1 |
|  | 4 | g4 | 0 | 100 | 1.52 |

| | Constituent of (A1) or (A2) Amount of constitutional unit with respect to 100 parts by mass of polymer (A2) (parts by mass) (C1) | Acid (B) Amount of acid (B) with respect to 100 parts by mass of (a1) + (a2) (parts by mass) (B) | Nucleophilic agent Amount of nucleophilic agent (C) with respect to 100 parts by mass of polymer (A1) (parts by mass) (C) | | Mass average molecular weight |
|---|---|---|---|---|---|
| | PLACCEL FM5 | Stearic acid | Bisphenol A | BPX-55 | |
| Example 1 | | | | | 14000 |
| 2 | | | | | 14000 |
| 3 | | | | | 14000 |
| 4 | | | | | 14000 |
| 5 | | | | | 13000 |
| 6 | | | | | 13000 |
| 7 | | | | | 14000 |
| 8 | 0.51 | | | | 14000 |
| 9 | 0.25 | | | | 14000 |
| 10 | 0.51 | | | | 14000 |
| 11 | | | 1 | | 14000 |
| 12 | | | 5.1 | | 14000 |
| 13 | | | | 0.51 | 14000 |
| 14 | | | | 1.1 | 14000 |
| 15 | | | | 0.51 | 14000 |
| 16 | | 4(*) | | | 14000 |
| Comparative 1 | | | | | 14000 |
| Example 2 | | | | | 14000 |
| 3 | | | | | 14000 |
| 4 | | | 1.1 | | 14000 |

(*)indicates that addition timing is simultaneous with polycarbonate resin (D)

Preparation of Resin Composition Containing Polycarbonate Resin (D) and (Meth)acrylate Resin Material (β1) and Evaluation of Molded Article Formed of Resin Composition:

In a polyethylene bag, 100 parts of the polycarbonate resin (D) (IUPILON S-2000F manufactured by Mitsubishi Engineering-Plastics Corporation) and 25 parts of the (meth) acrylate resin material (β1) were put, and these were mixed by thoroughly shaking the polyethylene bag with hands. The mixture thus obtained was melt-kneaded at 280° C. by using a twin-screw extruder (PCM 35 manufactured by Ikegai Corporation), and the extruded strand was cut, thereby obtaining a pellet.

The pellet was molded at a molding temperature of 280° C. and a mold temperature of 80° C. by using an injection molding machine (SE100DU manufactured by Sumitomo Heavy Industries, Ltd.), thereby obtaining a molded article having a sheet shape and a thickness corresponding to the respective evaluations. The evaluation results are presented in Table 2.

TABLE 2

| | | Polycarbonate resin (D) (parts by mass) | (Meth)acrylate resin material (parts by mass) | | | | | | | | | | | | |
|---|---|---|---|---|---|---|---|---|---|---|---|---|---|---|---|
| | | | β1 | β2 | β3 | β4 | β5 | β6 | β7 | β8 | β9 | β10 | α1 | α2 | α3 | α4 |
| Example | 1 | 100 | 25 | | | | | | | | | | | | | |
| | 2 | 100 | | 25 | | | | | | | | | | | | |
| | 3-1 | 100 | | | 25 | | | | | | | | | | | |
| | 3-2 | 100 | | | 43 | | | | | | | | | | | |

TABLE 2-continued

| | Sample | β3 | β4 | β5 | β6 | β7 | β8 | β9 | β10 | β11 | β12 | β13 | β14 | β15 | α6 | γ1 | γ2 | γ3 | γ4 | Molding defects | Haze of whitened site (%) | Pencil hardness | Haze of 2 mm molded article (%) |
|---|---|---|---|---|---|---|---|---|---|---|---|---|---|---|---|---|---|---|---|---|---|---|---|
| Example | 1 | | | | | | | | | | | | | | | | | | | A | 24 | F | 0.4 |
| | 2 | | | | | | | | | | | | | | | | | | | A | 21 | F | 0.4 |
| | 3-1 | | | | | | | | | | | | | | | | | | | A | 23 | F | 0.4 |
| | 3-2 | | | | | | | | | | | | | | | | | | | A | 30 | H | 0.4 |
| | 4-1 | | 25 | | | | | | | | | | | | | | | | | A | 25 | F | 0.4 |
| | 4-2 | | 43 | | | | | | | | | | | | | | | | | A | 28 | H | 0.4 |
| | 5 | | | 25 | | | | | | | | | | | | | | | | A | 9 | F | 0.3 |
| | 6 | | | | 25 | | | | | | | | | | | | | | | A | 16 | F | 0.4 |
| | 7-1 | | | | | 25 | | | | | | | | | | | | | | A | 20 | F | 0.4 |
| | 7-2 | | | | | 43 | | | | | | | | | | | | | | A | 30 | H | 0.4 |
| | 8 | | | | | | 25 | | | | | | | | | | | | | A | 17 | F | 0.4 |
| | 9 | | | | | | | 25 | | | | | | | | | | | | A | 18 | F | 0.4 |
| | 10 | | | | | | | | 25 | | | | | | | | | | | A | 23 | F | 0.4 |
| | 11 | | | | | | | | | 25 | | | | | | | | | | A | 17 | F | 0.4 |
| | 12 | | | | | | | | | | 25 | | | | | | | | | A | 21 | F | 0.4 |
| | 13 | | | | | | | | | | | 25 | | | | | | | | A | 16 | F | 0.4 |
| | 14 | | | | | | | | | | | | 25 | | | | | | | A | 12 | F | 0.4 |
| | 15 | | | | | | | | | | | | | 25 | | | | | | A | 18 | F | 0.4 |
| | 16 | | | | | | | | | | | | | | 25 | | | | | A | 19 | F | 0.4 |
| Comparative Example | 1-1 | | | | | | | | | | | | | | | 25 | | | | B | 26 | F | 0.4 |
| | 1-2 | | | | | | | | | | | | | | | 43 | | | | B | 32 | H | 0.4 |
| | 2 | | | | | | | | | | | | | | | | 25 | | | C | 88 | F | 0.4 |
| | 3 | | | | | | | | | | | | | | | | | 25 | | C | 86 | F | 0.4 |
| | 4 | | | | | | | | | | | | | | | | | | 25 | C | 89 | F | 0.4 |
| | 5 | | | | | | | | | | | | | | | | | | | A | 1 | 2B | 0.3 |

All samples include 100 parts by mass of base component (column not shown in this continued portion).

Examples 2 to 10

The (meth)acrylate resin materials (β2) to (β10) were obtained by conducting the same operation as in Example 1 except that the respective compositions were changed as described in Table 1. The proportions and mass average molecular weights of the respective constitutional units constituting the (meth)acrylate resin materials (β2) to (β10) are presented in Table 1.

Incidentally, acrylic acid (manufactured by Wako Pure Chemical industries, Ltd., special grade chemical) was used in Example 7.

In Examples 8 to 10, an unsaturated fatty acid hydroxyalkyl ester-modified ε-caprolactone (PLACCEL FM5 manufactured by DAICEL CORPORATION) was used as the nucleophilic agent (C) constituting the constitutional unit (c1). The nucleophilic agent (C) was added to the aqueous dispersion before the inside of the polymerization apparatus was purged with nitrogen.

Furthermore, the polycarbonate resin compositions of the invention were prepared by using the polycarbonate resin (D) and the (meth)acrylate resin materials (β2) to (β10). The molded articles having a sheet shape and a thickness corresponding to the respective evaluations were obtained by conducting the same operation as in Example 1 except that the kind and amount of the (meth)acrylate resin materials blended were changed as presented in Table 2. The evaluation results are presented in Table 2.

Examples 11 to 15

Polymers were obtained by conducting the same operation as in Example 1 except that the respective compositions were changed as described in Table 1. The polymers thus obtained were further mixed with the nucleophilic agent (C) to obtain (meth)acrylate resin materials (α1) to (α4) and (β15). The proportions and mass average molecular weights of the respective constitutional units of the polymers constituting the (meth)acrylate resin materials (α1) to (α4) and (β15) and the amount of the nucleophilic agent (C) are presented in Table 1.

Incidentally, bisphenol A (manufactured by TOKYO CHEMICAL INDUSTRY CO., LTD.) was used as the nucleophilic agent (C) in Examples 11, 12 and 15, and bisphenol A-propylene oxide adduct (product name: ADEKA POLYETHER BPX-55 manufactured by ADEKA CORPORATION) was used as the nucleophilic agent (C) in Examples 13 and 14.

Furthermore, the polycarbonate resin compositions of the invention were prepared by using the polycarbonate resin (D) and the (meth)acrylate resin materials (α1) to (α4) and (β15). The molded articles having a sheet shape and a thickness corresponding to the respective evaluations were obtained by conducting the same operation as in Example 1 except that the kind and amount of the (meth)acrylate resin materials blended were changed as presented in Table 2. The evaluation results are presented in Table 2.

Figure 1:
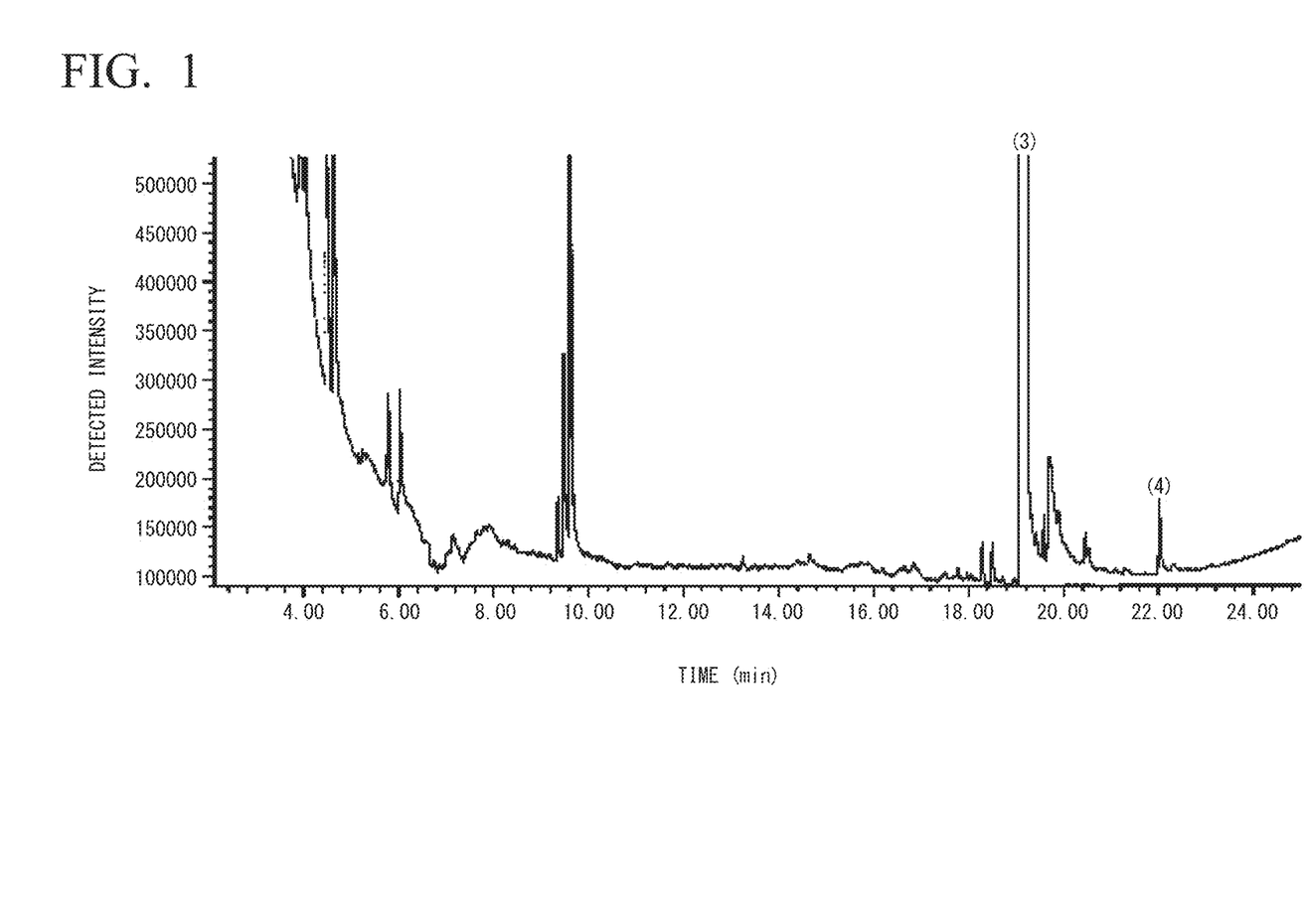
FIG. 1 is a diagram which illustrates the measurement results for thermal decomposition of a polycarbonate resin composition obtained in Example 15.
Figure 2:
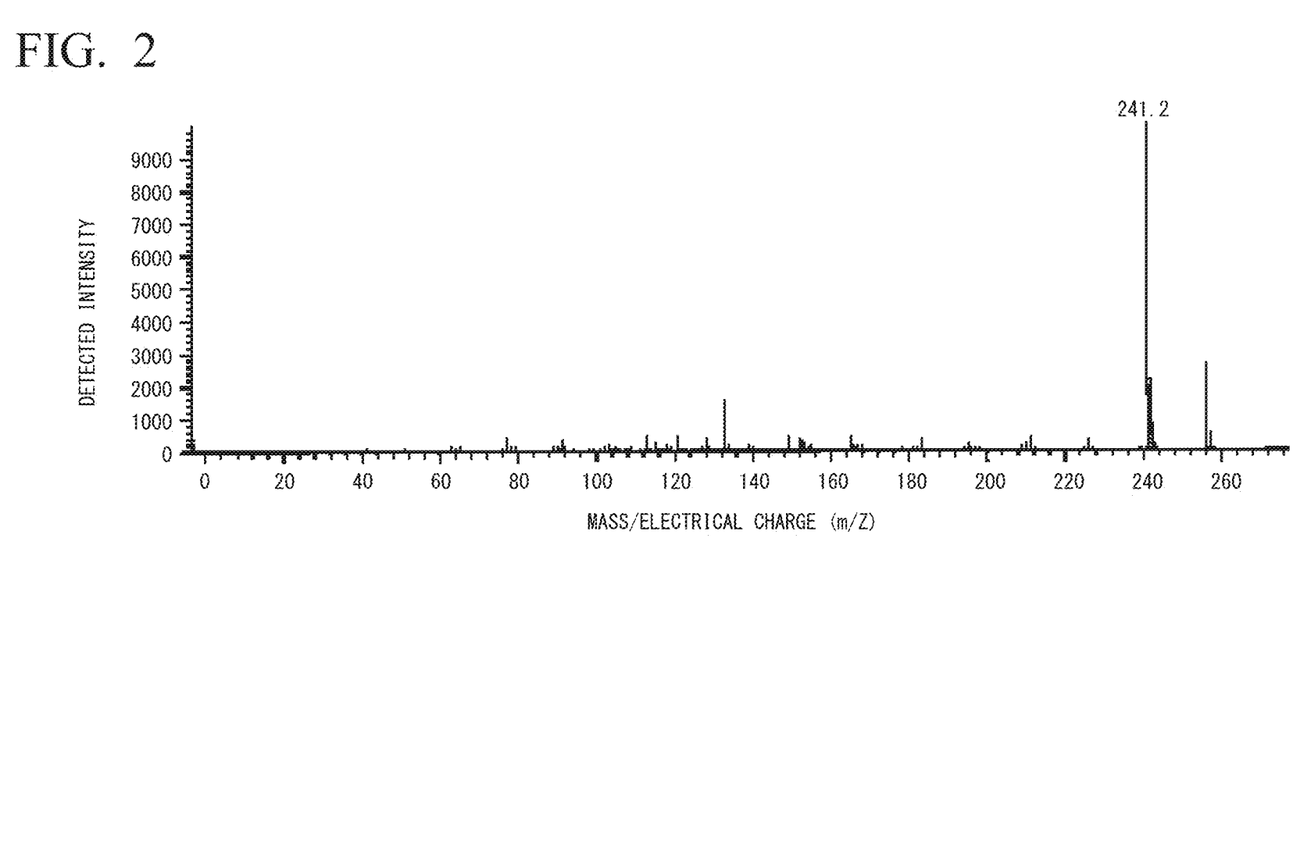
FIG. 2 is a diagram which illustrates the results for mass spectrometric analysis of a sample having a peak at a retention time of 19.3 minutes in the mass spectrum of a polycarbonate resin composition obtained in Example 15.
Figure 3:
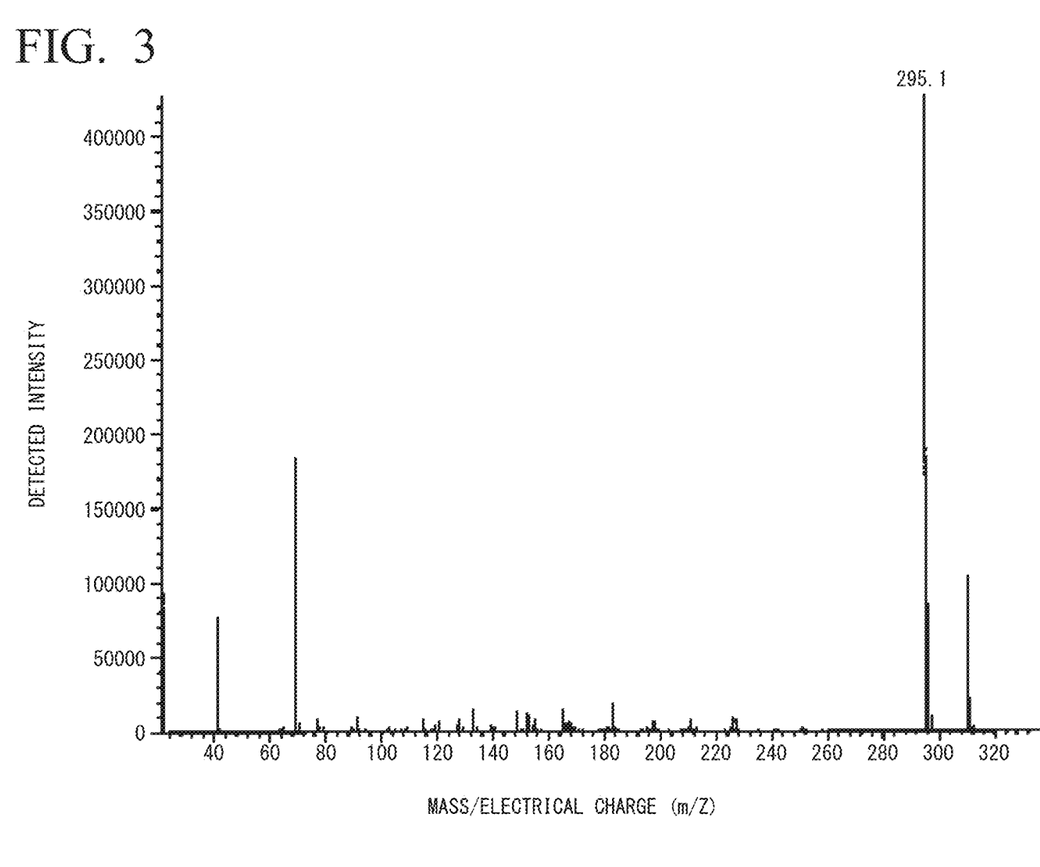
FIG. 3 is a diagram which illustrates the results for mass spectrometric analysis of a sample having a peak at a retention time of 22.1 minutes in the mass spectrum of a polycarbonate resin composition obtained in Example 15.

The polycarbonate resin composition obtained in Example 15 was subjected to the thermal decomposition measurement as illustrated in FIG. 1. As a result, peaks were confirmed at a retention time of 19.3 minutes and 22.1 minutes in the mass spectrum. The samples having peaks at these retention times of 19.3 minutes and 22.1 minutes were respectively subjected to mass spectrometry, as a result, the sample having a retention time of 19.3 minutes was attributed to a compound represented by Formula (3), and the sample having a retention time of 22.1 minutes was attributed to a compound represented by Formula (4). The results on the mass spectrometry are illustrated in FIGS. 2 and 3.

Example 16

A polymer was obtained by conducting the same operation as in Example 1 except that a compound constituting the constitutional unit (b1) was not used. Furthermore, a polycarbonate resin composition was prepared in the same manner as in Example 1 except that the polymer thus obtained, stearic acid (manufactured by Wako Pure Chemical Industries, Ltd.) as the acid (B) of a constituent of the (meth)acrylate resin material (α6), and the polycarbonate resin (D) were simultaneously mixed at the proportions described in Table 2. A molded article having a sheet shape and a thickness corresponding to the respective evaluations was obtained by conducting the same operation as in Example 1. The proportions and mass average molecular weights of the constitutional units of the polymer constituting the (meth)acrylate resin material (α6) and the amount of the acid (B) used are presented in Table 1. In addition, the evaluation results are presented in Table 2.

Comparative Examples 1 to 5

(Meth)acrylate resin materials (γ1) to (γ4) were obtained by conducting the same operation as in Example 1 except that the respective compositions were changed as presented in Table 1. The proportions and mass average molecular weights of the constitutional units of the (meth)acrylate resin materials (γ1) to (γ4) and the amounts of the acid (B) and nucleophilic agent (C) are presented in Table 1.

Incidentally, methacrylic acid (manufactured by MITSUBISHI RAYON CO., LTD.) was used as the acid (B) constituting the constituent (b1) and bisphenol A (manufactured by TOKYO CHEMICAL INDUSTRY CO., LTD) was used as the nucleophilic agent (C) in Comparative Example 3.

Furthermore, the polycarbonate resin compositions of the invention were prepared by using the polycarbonate resin (D) and the (meth)acrylate resin materials (γ1) to (γ4). The molded articles having a sheet shape and a thickness corresponding to the respective evaluations were obtained by conducting the same operation as in Example 1 except that the kind and amount of the (meth)acrylate resin materials blended were changed as presented in Table 2. The evaluation results are presented in Table 2.

Example 17

In a polyethylene bag, 100 parts by mass of the polycarbonate resin (D) and 100 parts by mass of the (meth)acrylate resin material (β7) were put and mixed by thoroughly shaking the polyethylene bag with hands. The mixture thus obtained was melt-kneaded at 280° C. by using a twin-screw extruder (PCM 35 manufactured by Ikegai Corporation), and the extruded strand was cut, thereby obtaining a pellet. To 100 parts by mass of the pellet thus obtained, 150 parts by mass of the polycarbonate resin (D) was further added, they were put in a polyethylene bag and mixed by thoroughly shaking the polyethylene bag with hands. The mixture thus obtained was melt-kneaded at 280° C. by using a twin-screw extruder, and the extruded strand was cut, thereby obtaining a pellet. This is used as a masterbatch.

The pellet was molded at a molding temperature of 280° C. and a mold temperature of 80° C. by using an injection molding machine, thereby obtaining a molded article having a sheet shape and a thickness corresponding to the respective evaluations. The evaluation results are presented in Table 3.

Example 18

A molded article having a sheet shape and a thickness corresponding to the respective evaluations was obtained by conducting the same operation as in Example 17 except that the (meth)acrylate resin material (β15) was used instead of the (meth)acrylate resin material (β7). The evaluation results are presented in Table 3.

TABLE 3

| Blending (parts by mass) | | | Example 17 | Example 18 |
|---|---|---|---|---|
| Polycarbonate resin composition | Masterbatch | Polycarbonate resin (D) | 100 | 100 |
| | | (Meth)acrylate resin material (β7) | 100 | — |
| | | (Meth)acrylate resin material (β15) | — | 100 |
| | | Polycarbonate resin (D) | 150 | 150 |
| Evaluation results | | Molding defects | A | A |
| | | Haze of whitened site (%) | 23 | 21 |
| | | Pencil hardness | F | F |
| | | Haze of 2 mm molded article (%) | 0.4 | 0.4 |

In Comparative Examples 1-1 and 1-2, the polymer (A1) was contained but the acid (B) or the nucleophilic agent (C) was not contained, and the improvement in molding defects of the molded articles was thus not confirmed.

In Comparative Examples 2 to 4, a polymer other than the polymer (A1) and the polymer (A2) was used, and the extent of molding defects of the molded article was thus great.

In Comparative Example 5, the surface hardness enhancer was not used, and the pencil hardness was thus insufficient.

INDUSTRIAL APPLICABILITY

The molded article of the invention is useful as members (housing and the like) of various kinds of devices (electrical devices, electronic devices, office automation devices, and the like), optical recording media, automobile parts (automobile headlamps, automobile interior materials, and the like), building members, and various kinds of sheets.

The invention claimed is:

1. A polycarbonate resin composition comprising:
a polycarbonate resin (D); and
a (meth)acrylate resin material comprising:
   a polymer (A1) having a constitutional unit (a1) derived from a compound represented by the following formula (1) and a constitutional unit (a2) derived from methyl methacrylate, and
at least one acid (B) and at least one nucleophilic agent (C),
wherein the content of the nucleophilic agent (C) in the (meth)acrylate resin material is from 0.001 to 2 parts by mass with respect to 100 parts by mass of the polymer (A1):

(1)

wherein Ar is an aryl group, and an aromatic ring in Ar is directly bonded to an ester terminal in Formula (1),
wherein a content of the acid (B) in the (meth)acrylate resin material is from 0.02 to 10 parts by mass with respect to 100 parts by mass of a sum of the constitutional unit (a1) and the constitutional unit (a2).

2. A molded article obtained by molding the polycarbonate resin composition according to claim 1.

3. The polycarbonate resin composition according to claim 1, wherein in the (meth)acrylate resin material a proportion of the constitutional unit (a1) is from 5 to 50% by mass in 100% by mass of a sum of the constitutional unit (a1) and the constitutional unit (a2).

4. The polycarbonate resin composition according to claim 1, wherein in the (meth)acrylate resin material a proportion of the constitutional unit (a1) is from 5 to 25% by mass in 100% by mass of a sum of the constitutional unit (a1) and the constitutional unit (a2).

5. The polycarbonate resin composition according to claim 1, wherein in the (meth)acrylate resin material a proportion of the constitutional unit (a2) is from 50 to 95% by mass in 100% by mass of a sum of the constitutional unit (a1) and the constitutional unit (a2).

6. The polycarbonate resin composition according to claim 1, wherein in the (meth)acrylate resin material the acid (B) comprises at least one or more of methacrylic acid or acrylic acid.

7. The polycarbonate resin composition according to claim 1, wherein in the (meth)acrylate resin material the nucleophilic agent (C) is a compound having a hydroxyl group or an organophosphorus compound.

* * * * *